United States Patent [19]
Burchall et al.

[11] 3,840,798
[45] Oct. 8, 1974

[54] POWER SUPPLY DEVICES

[76] Inventors: Malcolm Arthur Burchall, Maibois, Duck St., Saffron Walden; Donald Sydney Copplestone, 73 Sebastian Ave., Brentwood; John Edward Crowe, 11 Sakins Croft, Harlow; Norman James Brand, 23 Barnston Green, Dunmow; Ian Robert Bland, 8 Alderbury Rd., Stansted; Terence Frederick Cryer, 43 Barnston Green, Dunmow; Robert Stuart Thompson, 70 Orchard Piece, Blackmore, all of England

[22] Filed: Apr. 30, 1973

[21] Appl. No.: 355,462

[52] U.S. Cl. ............................ 321/2, 321/4, 321/11, 321/14, 321/19
[51] Int. Cl. .................................................... H02m
[58] Field of Search ............ 321/2, 4, 11, 12, 14, 18, 321/19

[56] References Cited
UNITED STATES PATENTS

| | | | |
|---|---|---|---|
| 3,418,557 | 12/1968 | Schaefer | 321/18 |
| 3,439,251 | 4/1969 | Schaefer | 321/2 X |
| 3,474,325 | 10/1969 | Schaefer | 321/2 |
| 3,490,028 | 1/1970 | Modiano | 321/2 |
| 3,742,371 | 6/1973 | Seibt et al. | 321/2 |

*Primary Examiner*—William H. Beha, Jr.
*Attorney, Agent, or Firm*—Lawrence E. Laubscher

[57] ABSTRACT

A power supply for producing a.c. power at low voltage from conventional a.c. supply mains, without heavy-duty mains transformers. The supply is rectified, and switched at high frequency, transformed to low or other voltage and rectified. Control of the switching means is by comparison of voltage ramps with a threshold voltage and the threshold voltage is controlled in accordance with variables including voltage and current output, to vary the duty cycle of the switching means and hence the output.

6 Claims, 6 Drawing Figures

POWER SUPPLY DEVICES

This invention relates to electric power supply devices of the converter type. There is a substantial requirement for relatively low voltage direct current supplies, providing substantial current output, for operation from alternating current (a.c.) supply mains, where the voltage of the direct current (d.c.) supply required is different, and usually substantially lower than, the alternating voltage.

In the past, the customary means for producing d.c. from a.c. mains has been a conventional voltage reducing transformer, supplying suitable rectifiers, but there are substantial disadvantages in supply apparatus of this type. A major disadvantage is that for relatively high power systems, transformers operating at mains frequencies are large, heavy and expensive. In addition difficulties are presented in providing direct current outputs the regulation of which with varying input or output current or voltage conditions is difficult to provide.

Suggestions have been made for converters where the a.c. is directly rectified, and the rectified d.c. is then switched at high frequency, to produce a high frequency a.c. which can then be suitably transformed and rectified. Though this arrangement involves a transformer, the use of high frequency permits a transfer physically smaller and less costly to be used than with the customary mains frequency transformer.

The high frequency system seeks to take advantage of the benefits of semiconductor switching devices, particularly their small size, but the limitations of use of semiconductors impose serious difficulties in such converters, especially those for large output currents at low voltage, and where the output power is required to be controlled to maintain a regulated voltage or current output under varying conditions.

It is a matter of some difficulty to provide that the converter will operate reliably within its specified operating conditions, without danger of over-current or over-voltage conditions, on the semiconductor devices, but it is especially difficult to arrange that the semiconductor switching devices will not run fortuitously into hazardous operating conditions which will lead to damage or catastrophic failure of the devices, for example when wide variations of conditions occur, or on component failure. Suitable devices are usually expensive to replace.

The invention has for its object to provide a converter in which these difficulties are substantially overcome, and the invention includes a power supply apparatus for providing a direct current output from an alternating current input, comprising rectifying means for rectifying an alternating current input to produce a rectified output, semiconductor switching means for switching said rectified input, a transformer, having an input and an output means for applying the said switched rectified current alternately in effectively opposite polarity to the transformer input to produce at the transformer output an alternating current output, a second rectifying means for rectifying said alternating current output to produce said direct current output, the frequency of said alternating current output being substantially greater than the frequency of said alternating current input, control means for controlling the switching of said semiconductor switching means, said control means including ramp voltage generator means for producing two ramp voltage trains of which the respective ramp voltages alternate in time, a threshold voltage source, voltage coincidence means for determining coincidence of a ramp voltage and the threshold voltage, said switching means being controlled by said coincidence means to control the period during which rectified current is fed to the transformer input and means for varying said threshold voltage in accordance with a condition of said direct current output.

Features and advantages of the invention will appear from the following description of an embodiment thereof, given by way of example, in conjunction with the accompanying drawings, in which:-

Figure 1:
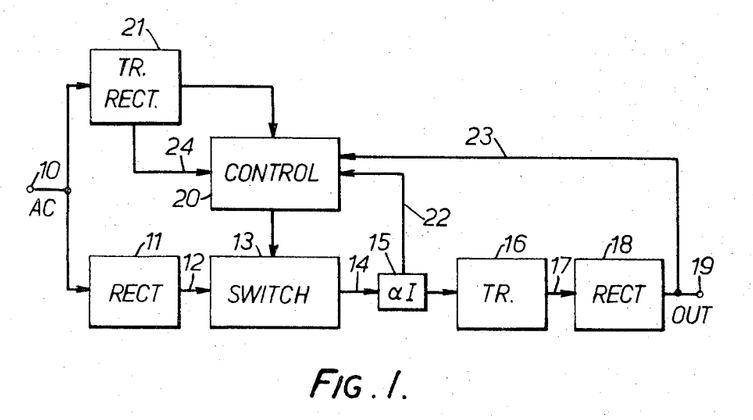
FIG. 1 is a block schematic diagram of a supply apparatus.
Figure 2A:
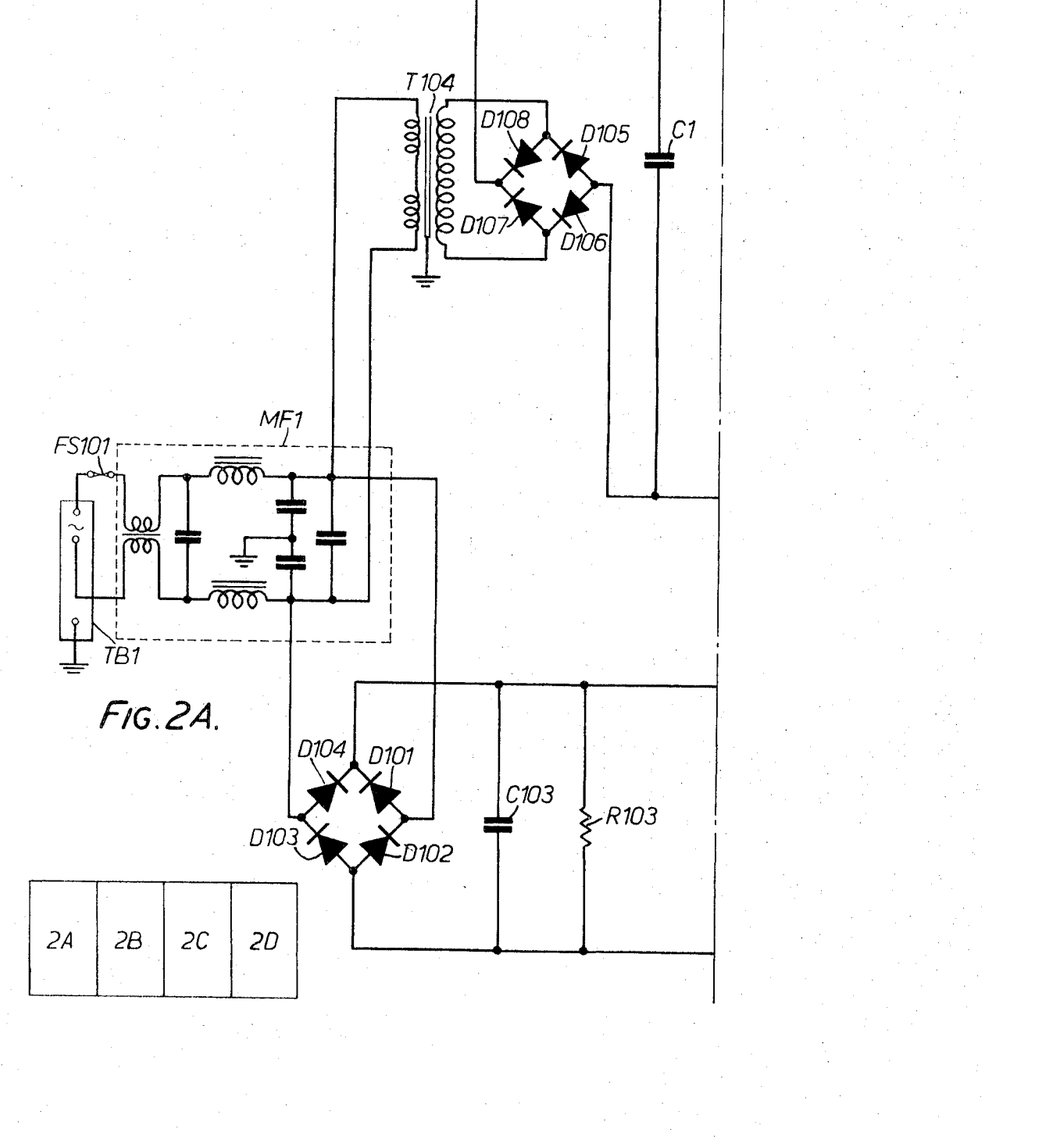
FIG. 2 is a more detailed circuit diagram of the apparatus of FIG. 1.
Figure 2B:
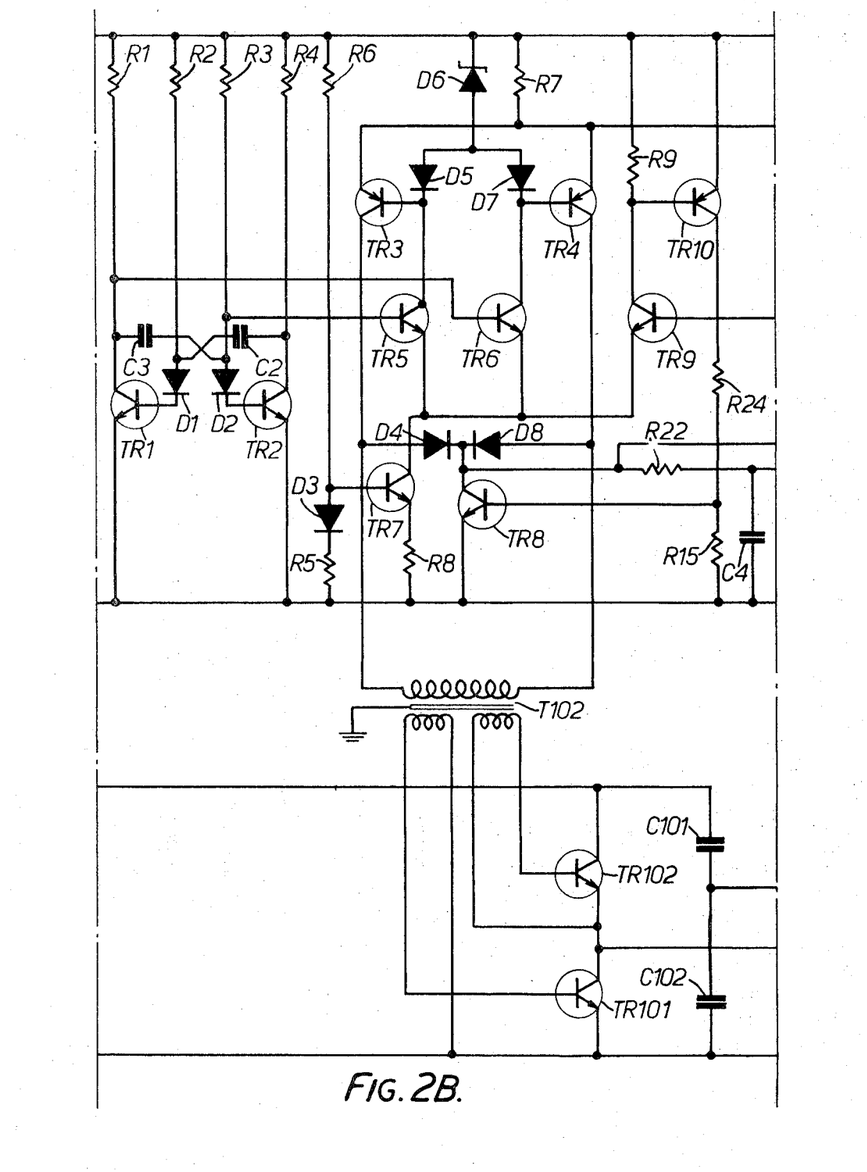
Figure 2C:
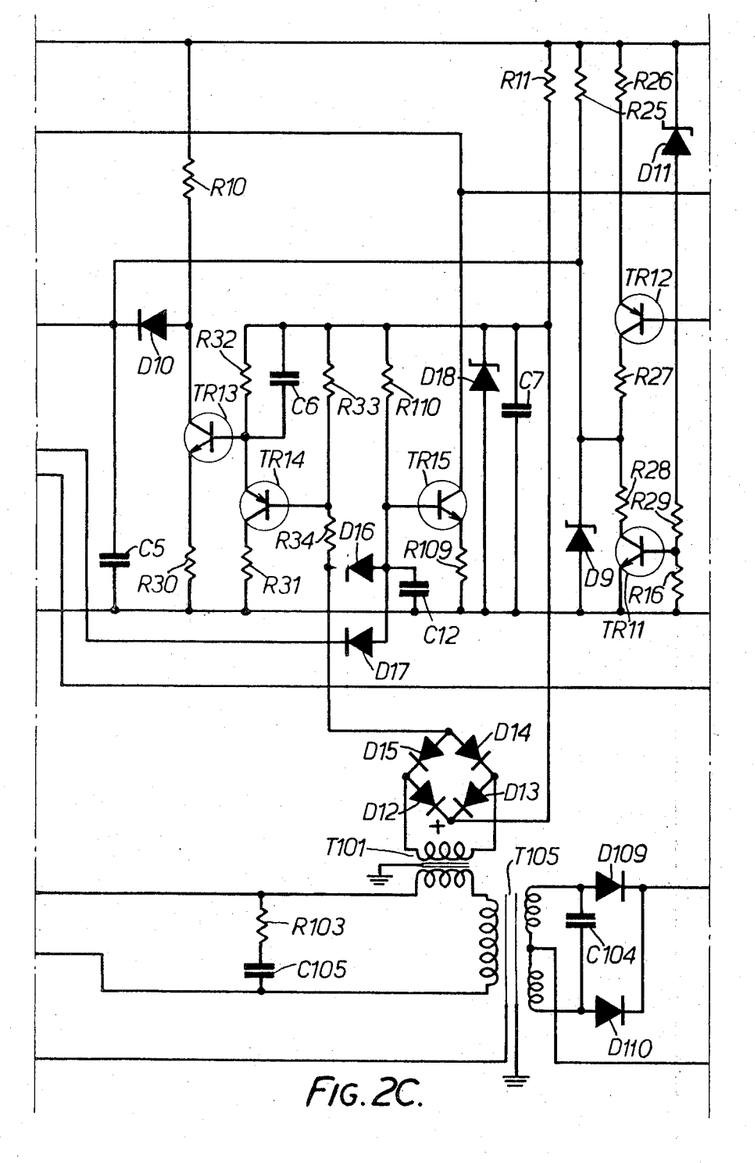
Figure 2D:
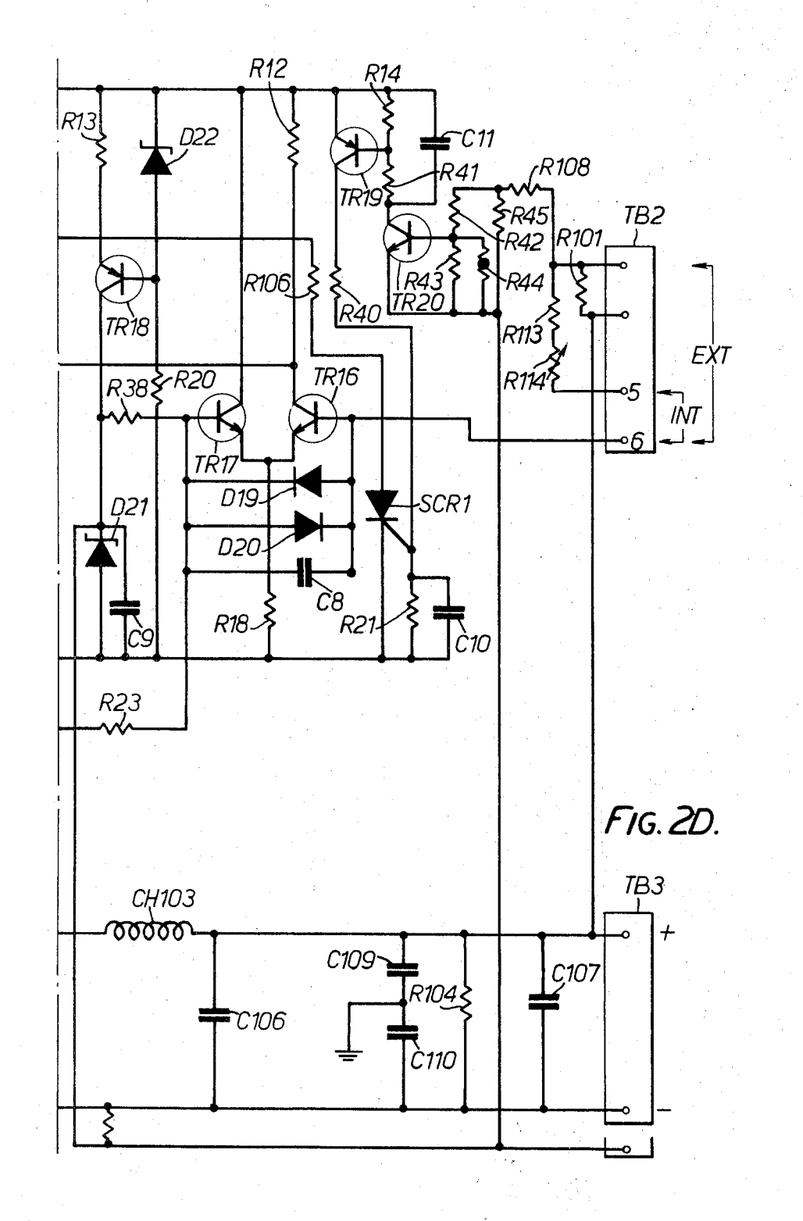

In FIG. 1, alternating current supply at mains frequency and voltage, such as 240v 50Hz, is applied to a terminal 10. The input voltage is rectified by means of a rectifier 11, to produce at the output 12 a unidirectional current output. The output at 12 is applied to a switching unit 13, comprising two semiconductor switching devices, conveniently transistors, which are switched alternately between on and off conditions, at a frequency substantially higher than mains frequency, and advantageously in the range of tens of kilohertz or higher. Accordingly, the output from the switching unit 13, appearing at 14, is high frequency switched a.c. The output current passes through a current sensor 15, and applied to a transformer 16, by which the high frequency alternating current is converted to an appropriate lower voltage, which will accordingly appear at 17, and is then applied to a further rectifier 18, and fed to output terminal 19. Though the transformer in unit 16 is required, since this is operating at a frequency much higher than conventional mains frequency, it can be of a very small physical size and of less cost than an equivalent transformer operating at mains frequency.

The output which appears at terminal 19 is controlled by controlling the period during which the transistors of the switching unit 13 are respectively conducting. If the duty cycle is low, and each transistor is in the on condition for a short period only of each cycle of operation, the output direct voltage at terminal 19 will be accordingly reduced. By increasing the duty cycle, the output at 19 can be increased to the maximum available.

Accordingly, the duty cycle of the transistors of the switching unit 13 are controlled for the purpose of regulating the output at 19. For this purpose, a control unit 20 is provided; the unit will comprise various amplifying devices, and for their operation a further small power unit 21 is provided, producing a suitable low voltage direct current output. The unit 21 can be operated at mains frequency; in view of the small power demanded of this unit, the use of a mains frequency transformer can be tolerated. The control unit 20 produces the desired control pulses for controlling the transistor switch unit 13 and the unit is made to respond to the current drawn by the mains supply unit, as detected by the current sensor 15. A connection from the current sensor is made over lead 22 to the control unit. Further, the control unit is made responsive to the output voltage appearing at terminal 19, as indicated by the lead 23. As a further safeguard, the control unit is made responsive to the output from rectifier unit 21, over lead 24, to ensure that no detrimental operation of the main switching unit 13 can occur due, for example, to failure of output from unit 21.

Accordingly, in the supply unit described, the output at 19 can be regulated to maintain a constant voltage against varying load conditions, and the transistors of the switching 13, which may be expensive components, are protected against damage due to abnormal conditions.

FIG. 2 shows in detail one way of carrying into effect a system of the type shown in FIG. 1. In FIG. 2, the input mains voltage is applied to a terminal board TB1, as marked, and fed through a mains supply fuse FS101 to a mains filter MF1. The output from the filter is rectified by means of a diode fullwave bridge D101 to D104, and the rectified output is filtered by capacitors C103, provided with a discharge resistor R103. The unidirectional voltage which appears across capacitor C103 is then fed to two switching transistors TR101 and TR102 which, with the capacitors C101 and C102 provide a so called half-bridge circuit. The base current of the transistors TR1 and TR2 are controlled by a control current input transformer T102, fed from a control unit to be described. The switched output of the transistor half-bridge circuit, consisting of pulses of direct current of opposite polarity and of controllable duration, are fed through the primary of a current sensing transformer T101 to the primary winding of a voltage changing transformer T105. A shunt circuit comprising resistor R103 and capacitor C105 form a damping network which optimises the switching power dissipation in the main switching transistors.

The low voltage output of transformer T105 is rectified by diodes D109 and D110 and fed through a filter inductor CH103, filter capacitor C106, and applied to the output terminals on terminal block TB3. The output is shunted by capacitor C107, and a resistor R104 provides a small load current at zero external load conditions. Capacitors C107, C109 and C110 are provided for the purpose of reducing high frequency noise which may appear at the output terminals. Capacitor C104, connected across the secondary of transformer T105 is for suppressing switching spikes which may arise from the operation of the main switching transistors.

The applied mains frequency supply, after passing through filter MF1 is applied also to the primary of an auxiliary mains transformer T104, which with the bridge rectifier provided by diodes D105 to D108, and smoothed by capacitor C1, provides a small low voltage auxiliary supply for operating the control and associated units. The control unit comprises transistors TR1 and TR2, which together with resistors R1 to R4, capacitors C2 and C3 and diodes D1 and D2, form a free running multivibrator, producing ramp waveforms. The manner in which this multivibrator operates is described also with respect to FIG. 5 of our prior British application No. 58448/71. The approximately linear portion of the discharge of the timing capacitors C2, C3 by the collector load resistors R1 and R4 are caused to occur through the full half cycle of operation. A transistor TR7, in conjunction with resistors R5, R6, R8, and diode D3 provide a constant current source; this current source can divide between three transistors TR5, TR6 and TR9. The current will flow through transistor TR9, and one or other of transistors TR5 or TR6, depending upon the half-cycle of operation, as determined by transistor TR1 or TR2. Transistors TR3 and TR4 supply current to the two halves of the primary winding of transformer T102, the secondary windings of which control the switching of the main switching transistors TR101 and TR102 by controlling the base currents of those transistors. Transistors TR5 and TR6 control respectively the transistors TR3 and TR4.

The duty cycle of the switching of the main transistors is controlled by varying a threshold value at which a switching action takes places, by controlling the operation of transistor TR9, the threshold level can be varied, thereby to vary the duty cycle of operation and hence the average output of the converter.

At the commencement of half-cycle of operation, the constant current through transistor TR7 will pass through transistor TR9. At some point in the cycle of operation, defined by a threshold level at the base of transistor TR9, current will transfer from transistor TR9 to either transistor TR5 or TR6, depending upon the half-cycle of operation. In turn, transistor TR3 or TR4 is caused to conduct a constant current controlled by resistor R7 and zener diode D6 and either diode D5 or D7. This constant current is also controlled by a variable drive circuit comprising transistor TR15 and resistors R110 and R109 the operation of which is described hereinafter. The drive current to the main switching transistors through TR3 and TR4, can also be diverted by circuits comprising diode D4 or D8 and transistor TR8, also in a manner to be described.

The current conditions in transistor TR9 are significant in determining the duty cycle of the switching of the main transistors and hence the output of the supply unit. The threshold level at the base of this transistor TR9 is controlled by four main factors.

The first of these factors is the conditions in the circuit comprising two resistors R25 and R28, which impose an upper limit to the duty cycle of about 85 percent of the full half-cycle. Diode D9 imposes an upper limit to the base voltage of transistor TR9, to prevent a reverse current path through transistors TR9, TR5 or TR6 and TR2 or TR1.

The second factor controlling the operation of transistor TR9 is the output voltage existing across capacitor C1, that is, the output voltage of the auxiliary supply. To prevent fortuitous operation of the main transistors during a run-up period, transistor TR11 is provided and is connected in series with resistors R28, R27, transistor TR12 and resistor R26 across the supply from the auxiliary unit. The base of transistor TR11 is controlled by zener diode D11, resistor R29 and resistor R16.

The third factor affecting the transistor TR9 is the output voltage of the unit. Transistors TR16 and TR17 form a voltage comparator, the comparison output of which controls the base current of transistor TR12, in turn controlling the base current of transistor TR9. This circuit maintains the output voltage constant in normal conditions.

The fourth factor affecting transistor TR9 is the current output from the current sensing transformer T101, which operates in conjunction with transistor TR13, in a manner to be described.

It is considered that the manner in which the first two of these factors operate will be apparent from the foregoing description. As to the third factor, the manner in which the transistor TR9 responds to voltage control, diode D22, resistor R13 and transistor TR18 form a constant current source for a voltage control reference diode D21. Resistors R22 and R23, and capacitor C4 feed back a signal integrated from the pulse width modulated waveform at the collector of transistor TR8, to provide an offset voltage in resistor R38, to improve the line and load regulation of the output voltage. The voltage across R38, standing on the reference voltage from zener diode D21 is applied to the base of transistor TR17, which with transistor TR16 forms a conventional long-tailed pair voltage comparator. This voltage at the base of TR17 is accordingly compared with the voltage at the base of TR16, which is derived from the resistive voltage divider comprising resistors R108, R113 and R114. Resistor R114 is variable to permit voltage control, and this circuit may be externally accessible, from terminal board TB2, for control purposes.

The voltage comparison output voltage appearing across the resistor R12 in the collector of transistor TR16 is fed to the base of transistor TR12, included in the circuit controlling the base current of transistor TR9. Diodes D19 and D20 protect transistors TR16 and TR17 from transient voltages, and capacitor C8 prevents loop instability in the voltage control mode. The voltage at the base of transistor TR12 will cause pulse width modulation of the inverter, in the manner which will be apparent and which is further described in our British application No. 58448/71.

The control of transistor TR9 in accordance with the current conditions in the output circuit provides long term current control to protect the unit against sustained overloads, provides immediate current control to protect the main switching transistors TR101 and TR102 against failure of diodes D109 or D110 or transformer T105, and also provides variable drive control to prevent the main switching transistors being over-driven under conditions of light loading.

The current in the primary winding of the current transformer T101 remains in a reasonably constant ratio to the output direct current, and can therefore be used for current control purposes. The current in the secondary winding of transformer T101 is rectified by the diode bridge comprising diodes D12 to D15, to produce a voltage across resistors R33 and R34 which has a peak level proportional to the output current. This peak level is applied by resistors R33 and R34 and transistor TR14 to capacitor C6, and is compared with the voltage across a current control reference diode D18 by transistor TR14. If The voltage reaches a large enough value, transistor TR13 is cut off. This allows current from resistor R10 previously diverted through transistor TR13 and isolated by diode D10, to flow through diode D10 into the base of transistor TR9, raising the threshold level, and hence reducing the operative duty cycle, to maintain a constant current into the external load.

A further feature of this circuit is that since capacitor C6 is charged from the low impedance source presented by transistor TR14, response to increasing current is obtained during the duration of an operating cycle, and is sufficiently rapid to protect the main switching transistors TR101 and TR102 against internal circuit failures. High speed is not required in securing protection against external overloads or short circuits, because of the delay which is in effect produced by the use of the integrating choke CH103, which prevents the current rising at a rate which is too rapid for the control circuit to respond to. To prevent loop instability in the constant current mode, capacitor C6 has a relatively low discharge rate through resistor R32.

A third feature of the current control circuit is the variable drive control. It is desirable for the inverter transistors TR101 and TR102 to be switched on by a base current which is as high as possible, so as, in effect, to give a degree of overdrive. This is for the reason that such overdrive reduces current rise times in the transistors, and hence reduces switching power losses, with a consequent improvement in overall efficiency. However, it is also desirable that when the switching transistors are being turned off, the amount of overdrive is no more than the minimum required, since excessive drive increases the storage time of the transistors. This does not necessarily increase the dissipation on switching off, but can lead to overlap of the conduction times of the two transistors, particularly at small values of load current. The variable drive is achieved by the fact that when the rising ramp voltage at the base of transistor TR5, or TR6, depending on the half-cycle being considered, reaches the threshold level of the base of TR9, the current previously flowing in transistor TR9 is transferred into, say, transistor TR5, turning on the associated current source transistor TR3. At this instant, transistor TR8 is still in conduction, since the changeover of current from TR9 to TR5 is not instantaneous, and current starts to flow in transistor TR3 before the chain of TR9 and TR10 turns off transistor TR8.

When transistor TR8 turns off, it allows the full drive from transistor TR3 to pass through the primary of drive transformer T102 and turn on the main switching transistor TR102, with a heavy value of overdirve. Transistor TR15, which during the conduction period of transistor TR8 was held off by the action of the isolating diode D17, is temporarily held switched off by the charge on capacitor C12. When the load current is established in the main transformer T105, this is sensed by the current transformer T101, to produce a voltage across the resistors R33 and R34 as described above. This voltage holds transistor TR15, through isolating diode D16, at a level dependent upon the output current. A variable amount of the available drive current in resistor R7 is therefore diverted through transistor TR15 and the amount of drive current in transistor TR102 reduces to a level commensurate with its actual collector current. At the end of a half-cycle, the sequence of events is reversed, with a current transferring back from transistor TR5 to TR9 and turning on transistor TR8. This effectively short circuits the primary of the drive transformer T102, which applies a low impedance between the base and emitter of the switching transistor TR102, and switches it off. This low impedance condition continues to exist until the start of the next conduction period, when TR101 is turned on and a reverse bias is applied to transistor TR102.

The circuit also provides protection against overvoltage, certain faults can occur within the unit, which create an over-voltage condition of the output terminals, which could cause damage to voltage sensitive loads. To prevent this, the output voltage is sensed by transistor TR20 which is biased by resistors R101, R108, R45, R42 and R43, with thermistor R44, in a manner such that it commences to conduct at the desired predetermined over-voltage level. Thermistor R44 provides temperature compensation for the temperature coefficient of the base-emitter voltage of transistor TR20. By resistors R14, R41 and capacitor C11 transistor TR20 will turn on transistor TR19, with a slight delay due to capaictor C11, the purpose of which is to prevent operation due to any transient noise voltages, and resistors R21 and R40, and capaictor 90 transistor TR19 turns on thyristor SCR1, through resistor R39. This diverts the drive current from resistor R7 through resistor R106 and prevents the inverter transistors from being turned on.

Figure 3:
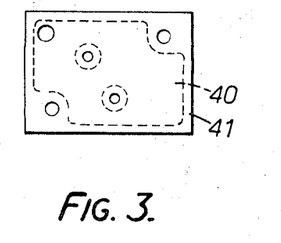
FIG. 3 shows a guard shield.

It has been found that certain circulating currents in the chassis can give rise to interference, and shields can be used to limit currents produced capacitatively, the shields being disposed adjacent elements and between them and, say, a metal mounting chassis. A typical shield is shown in FIG. 3, consisting of a metal plate 40, laminated and enclosed within an insulating cover 41; the current produced in the shield can then be by-passed to an appropriate point in the circuit obviating currents in the chassis and reducing the degree of filtering required.

Advantageous features of the apparatus described include:

1. The method of converting a D.C. voltage level into two trains of bi-phase width-controlled pulses by means of a pair of transistors TR5 and TR6 whose bases are driven by a pair of alternately occurring timing ramps, the conduction time of these transistors being determined by the presense of a threshold conduction voltage derived from a third transistor TR9.

2. The derivation of a pair of bi-phase timing ramps directly from a cross-coupled multivibrator TR1 and TR2, without the addition of an integration stage, by causing the approximately linear portion of the discharge of the timing capacitors C2 and C3 by the collector load resistors R1 and R4 to occur throughout the entire half-cycle of oscillation.

3. The use of the current pulses in the threshold level transistor TR9, which conveniently coincide with the "dwell" or turned-off periods of the inverter stage, to operate the drive turn-off transistor TR8. These pulses can also be used to prevent coincident conduction of the main inverter transistors TR101 and TR102.

4. The method of turn-off in inverter circuits whereby at the moment of turn-off a transistor TR8 is switched into conduction applying a low impedance across the primary winding of the drive transformer T102. This low impedance when transformed by the square of the turns ratio of the drive transformer being capable of extracting sufficient reverse base current from the inverter transistors TR101 and TR102 to cause rapid turn-off.

5. The method of varying inverter transistor drive currents with load current by using the output from the current sensing transformer T101 to control a transistor TR15 which subtracts a proportion of the constant current generated by R7 and diverts it from the drive transformer T102.

6. The use of a small signal thyristor operating on the control circuits to protect against over-voltage instead of a large dissipative crowbar operating across the output terminals.

7. The provision of a mid-point of the D.C. supply voltage by means of small high-frequency response capacitors C101 and C102 instead of splitting the main 100 Hz reservoir capacitor C103. This results in a space saving since a single capacitor at say 400v rating only occupies half the volume of two equivalent 200v capacitors in series, the provision of a low impedance source for high frequency currents which have to flow in the output transformer T105 and also provides a safety factor in the event of a sudden mismatch of inverter conduction times due to the relatively low amount of stored energy in the capacitors C101 and C102.

8. The method of making possible the prevention of simultaneous conduction of both inverter transistors TR101 and TR102 by means of current sense transformer T101 or, if desired by its equivalent of a tertiary winding on the output transformer T105, to control small signal transistors connected between the base and emitter terminals of the inverter transistors TR101 and TR102 in such a manner that which either inverter transistor is in a condition of conduction the small signal transistor connected across the other inverter transistor is turned on thus preventing conduction in that inverter transistor.

9. The method of delaying the application of the variable current drive by the addition of a capacitor C12 which allows full drive current to be applied for the initial proportion of the conduction period. This provides fast current turn-on in the inverter transistors TR101 and TR102.

10. The method of applying a local feedback signal into the voltage amplifier TR16 and TR17 by integrating the pulse-width-modulated waveform (at the collector of TR8) and applying this to R38.

11. The method of current protection whereby fast protection is given to increasing overloads by charging the current loop stability capacitor C6 from a low impedance source TR14 and discharging it through a relative high impedance load R32, and 12. The provision of guard shields to by-pass capacitive stray currents and contain them within the unit.

We claim:

1. A power supply apparatus for providing a direct current output from an alternating current input, comprising rectifying means for rectifying an alternating current input to produce a rectified output; semiconductor switching means for switching said rectified input; a transformer having input and output terminals; means for applying the switched rectified current alternately in effectively opposite polarity to the transformer input terminals to produce at the transformer output terminals an alternating current output; a second rectifying means for rectifying said alternating current output to produce a direct current output, the frequency of said alternating current output being substantially greater than frequency of said alternating current input; control means for controlling the switching of said semiconductor switching means, said control means including ramp voltage generator means for producing two ramp voltage trains of which the respective ramp voltages alternate in time; a threshold voltage source; a constant current source; first, second and third transistors through which in parallel current from said constant current source is arranged to pass; conductor means for impressing on said first and second transistors said ramp voltage trains, respectively, whereby said first and second transistors are rendered alternatively conductive; and conductor means for applying voltage from said threshold voltage source to said third transistor to control current in said third transistor in accordance with said threshold voltage, whereby one of said first and second transistors passes current for a period dependent upon the voltage of said ramp voltage applied thereto and upon said threshold voltage, and said control means controls said switching means in accordance with the period during which said first and second transistors pass current, whereby to control the period during which rectified current is fed to the transformer input, said threshold voltage source varying said threshold voltage in accordance with a condition of said direct current input.

2. A power supply apparatus as claimed in claim 1, and comprising means for feeding current from said first and second transistors to said respective semiconductor switching means to cause said switching means to conduct, a fourth transistor coupled to the output of said first and second transistors to terminate pulses from said first and second transistors and thereby reduce said semiconductor switching means to nonconduction, and circuit means for controlling said fourth transistor in accordance with the duration of the periods during which said first and second transistors pass current.

3. A power supply apparatus as claimed in claim 2, wherein said semiconductor switching means each comprises a switching transistor, and wherein said fourth transistor is arranged to impose a low impedance across an input of said semiconductor switching transistors whereby to extract reverse base current from said transistors to effect rapid turn off to the nonconducting condition.

4. A power supply apparatus as claimed in claim 1, and comprising current sensing means producing an output responsive to a current which is a function of output current of said apparatus, a current sensing control transistor the current in which is responsive to the output current of said current sensing means, said sensing control transistor current being arranged to modify the said constant current shared by said first, second and third transistors whereby to control the switching of said semiconductor switching means as a function of output current from said apparatus.

5. A power supply apparatus as claimed in claim 4, and comprising capacitor delay means for delaying the response of said apparatus to said output current.

6. A power supply apparatus as claimed in claim 4, wherein said current sensing means is a current transformer having first and second windings through the first of which passes current switched by said switching means and including a rectifier device for rectifying voltage produced at the second winding of said current transformer.

* * * * *